(12) United States Patent
Ding et al.

(10) Patent No.: US 9,876,420 B2
(45) Date of Patent: Jan. 23, 2018

(54) SUB-MODULE DISTRIBUTED CONTROL METHOD, DEVICE AND SYSTEM

(71) Applicants: NR ELECTRIC CO., LTD, Jiangsu (CN); NR ENGINEERING CO., LTD, Jiangsu (CN)

(72) Inventors: Jiudong Ding, Jiangsu (CN); Jie Tian, Jiangsu (CN); Yunlong Dong, Jiangsu (CN); Haiying Li, Jiangsu (CN); Dongming Cao, Jiangsu (CN); Haibin Liu, Jiangsu (CN); Yu Lu, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 15/528,100

(22) PCT Filed: Oct. 28, 2015

(86) PCT No.: PCT/CN2015/093086
§ 371 (c)(1),
(2) Date: May 19, 2017

(87) PCT Pub. No.: WO2016/091022
PCT Pub. Date: Jun. 16, 2016

(65) Prior Publication Data
US 2017/0317574 A1   Nov. 2, 2017

(30) Foreign Application Priority Data
Dec. 11, 2014   (CN) .......................... 2014 1 0768743

(51) Int. Cl.
*H02M 1/00* (2006.01)
*H02M 7/00* (2006.01)

(52) U.S. Cl.
CPC ............... *H02M 1/00* (2013.01); *H02M 7/00* (2013.01); *H02M 2001/0003* (2013.01)

(58) Field of Classification Search
CPC .. H02M 1/00; H02M 7/00; H02M 2001/0003; H02M 3/1584; H02M 3/285;
(Continued)

(56) References Cited

U.S. PATENT DOCUMENTS 7,851,945 B2 * 12/2010 Williams .................. G05F 1/66
307/18
7,889,525 B2 * 2/2011 Moussaoui ........... H02M 3/157
323/268

(Continued)

FOREIGN PATENT DOCUMENTS

CN   102916592   2/2013
CN   103280952   9/2013
(Continued)

OTHER PUBLICATIONS

"International Search Report (Form PCT/ISA/210)", dated Jan. 21, 2016, with English translation thereof, pp. 1-4.
(Continued)

*Primary Examiner* — Adolf Berhane
(74) *Attorney, Agent, or Firm* — JCIPRNET

(57) ABSTRACT

A submodule distributed control method, device and system are provided. Submodules of each bridge arm are grouped. Each group corresponds to one valve based controller. An upper-level control device calculates a weight of each group according to a bridge arm current, an average voltage of normal submodules in each group, and the number of the normal submodules in each group; calculates, according to the number of submodules to be input in a corresponding bridge arm, the number of submodules being input in each group and delivers the number to the valve based controller.
(Continued)

The valve based controller operates according to a voltage balancing policy and a gating method that are provided in the prior art.

8 Claims, 3 Drawing Sheets

(58) Field of Classification Search
CPC .. H02M 3/33561; H02M 7/49; Y10T 307/582
USPC ............... 363/65–71; 307/11, 18, 43, 52, 58
See application file for complete search history.

(56) References Cited

U.S. PATENT DOCUMENTS

| | | | | |
|---|---|---|---|---|
| 2002/0041504 | A1* | 4/2002 | Steinke ................ | H02H 7/1216 363/65 |
| 2005/0180181 | A1* | 8/2005 | Gaudreau ................ | H02J 1/10 363/71 |
| 2009/0132494 | A1* | 5/2009 | Gutlapalli ......... | G06F 17/30011 |
| 2011/0149448 | A1* | 6/2011 | Hori ......................... | H02H 3/40 361/47 |
| 2014/0091622 | A1* | 4/2014 | Lucas ...................... | H02J 3/32 307/19 |
| 2016/0105020 | A1* | 4/2016 | Guo .......................... | H02J 3/32 307/31 |
| 2016/0141950 | A1* | 5/2016 | Goth ......................... | G05F 3/02 363/65 |
| 2016/0144974 | A1* | 5/2016 | Matheson ................ | H02J 1/10 307/9.1 |
| 2016/0380551 | A1* | 12/2016 | Hoerger .................. | H02M 1/12 363/65 |

FOREIGN PATENT DOCUMENTS

| | | |
|---|---|---|
| CN | 103929081 | 7/2014 |
| CN | 104009663 | 8/2014 |
| CN | 104038052 | 9/2014 |
| JP | 2014042396 | 3/2014 |

OTHER PUBLICATIONS

"Written Opinion of the International Searching Authority (Form PCT/ISA/237)" of PCT/CN2015/093086, dated Jan. 15, 2016, pp. 1-8.

* cited by examiner

US 9,876,420 B2

SUB-MODULE DISTRIBUTED CONTROL METHOD, DEVICE AND SYSTEM

CROSS-REFERENCE TO RELATED APPLICATION

This application is a 371 of international application of PCT application Ser. No. PCT/CN2015/093086, filed on Oct. 28, 2015, which claims the priority benefit of China application no. 201410768743.3, filed on Dec. 11, 2014. The entirety of each of the above-mentioned patent applications is hereby incorporated by reference herein and made a part of this specification.

BACKGROUND OF THE INVENTION

Field of the Invention

The present invention relates to the field of power electronics technologies, and in particular, to a submodule distributed control method, device, and system.

Description of Related Art

With development of power electronics technologies, a flexible direct current (DC) power transmission technology based on a modular multilevel converter gains extremely wide attention and is widely applied. For bridge arms of this topology, basic operation units are cascaded and direct serial connection of a large number of switch elements is avoided, without a problem such as driving consistency, thereby greatly reducing technical barriers to DC power transmission. However, because in such topology, energy is scattered and stored in capacitors of submodules of the bridge arms, how to rapidly implement balanced control over voltages of the capacitors of the submodules during operation is one of the implementation difficulties.

Currently, in a policy of balancing voltages among submodules, a method of sequencing and gating voltages of the capacitors of the submodules is generally used. However, when there are an inordinate number of submodules in the bridge arms, time overheads spent in a sequencing algorithm account for a large proportion, and a load rate of a valve based controller is excessively high, and the number (the number of links) of the submodules needs to correspondingly grow as the voltage level increases, such that the time overheads spent in the sequencing algorithm exponentially increase.

On the other hand, because each submodule needs to communicate with the valve based controller, the number of communication interfaces between the valve based controllers and the submodules increase as the number of links grows. However, hardware expansion may result in substantial increase in the costs and also in the development period, which hinders expansion of the valve based controller.

The patent No. CN201210451946 proposes "Control Method for Grouping and Voltage Balancing of Submodules of Modular Multilevel Converter". In this invention, submodules are equally grouped, and a total voltage of each group is calculated and an energy equilibrium factor of each group is calculated, whereby the number of the submodules to be input in each group is calculated. Such an algorithm requires equally grouping the submodules, without considering situations, such as a fault or a bypass occurring in the submodules during operation, that lead to a dynamic change in the number of normal submodules. In addition, the method in which the energy equilibrium factor of each group is calculated by using the total voltage of each group in this invention may lead to submodule voltage divergence when the normal submodules in each group differ greatly in number, and may probably result in the calculated number of input submodules being greater than the number of the normal submodules.

Therefore, it is necessary to seek a solution feasible in engineering application to reduce a load rate of the valve based controller, improve expandability of the valve based controller, and achieve an excellent effect of balancing voltages among submodules.

SUMMARY OF THE INVENTION

Technical Problem

An objective of the present invention is to provide a submodule distributed control method, device, and system, which avoid an increase in a load rate of a valve based controller caused by an increase in the numbers of links, avoid an increase in the costs and the development period caused by hardware expansion of the valve based controller, and achieve an excellent effect of balancing voltages among submodules.

Technical Solution

To achieve the foregoing objective, the present invention adopts the following technical solutions:

A submodule distributed control method, characterized in that all submodules of each bridge arm of a converter valve are grouped into M groups, M being ≥1, all the submodules include faulty submodules and normal submodules, the respective submodules in each group are equal or unequal in number, the normal submodules in each group are allowed to dynamically change in number, each group corresponds to one valve based controller, each valve based controller separately operates, an upper-level controller delivers the number of input submodules to the valve based controller, and the number of input submodules is calculated as follows:

(1) finding, by each valve based controller, an average voltage $\overline{U}_i$ of the normal submodules administered by the valve based controller, counting the number $N_i^{ok}$ of the normal submodules, and sending the average voltage and the number to the upper-level controller;

(2) acquiring, by the upper-level controller, a bridge arm current $I_{arm}$ and determining a direction;

(3) solving, by the upper-level controller, a weight $B_i$ of each administered valve based controller according to the average voltage $\overline{U}_i$ of the normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M}(N_i^{ok}/\overline{U}_i)},$$

and when the bridge arm current is in a discharging direction, $$B_i = B_i^n = \frac{\overline{U}_i N_i^{ok}}{\sum_{i=1}^{M} (\overline{U}_i N_i^{ok})};$$

and (4) calculating, by the upper-level controller according to the total number $N_{total}^{on}$ of the submodules to be input in a corresponding bridge arm and the weight $B_i$ of each valve based controller, the number $N_i^{on}$=round ($B_i$ $N_{total}^{on}$) of the submodules being input in each valve based controller, where round is a rounding function.

In the foregoing solution, the upper-level controller administers one or more bridge arms of the converter valve.

In the foregoing solution, the normal submodules are submodules that can participate in normal switching.

In the foregoing solution, the faulty submodules include submodules that are in a bypass state and a locked state, and a vacant slot on a converter valve tower.

In the foregoing solution, a value of the subscript i of all variables ranges from 1 to M.

In the foregoing solution, the charging direction in step (3) refers to a direction of the bridge arm current when a submodule voltage rises, and the discharging direction refers to a direction of the bridge arm current when the submodule voltage drops.

The present invention further provides a submodule distributed control device, which includes a direction determination unit, a weight solution unit, a selection switch unit, a bridge arm input calculation unit, and a valve based controller input calculation unit, where the direction determination unit is configured to determine a direction according to the acquired bridge arm current $I_{arm}$;

the weight solution unit is configured to solve a weight $B_i$ of each administered valve based controller according to an average voltage $\overline{U}_i$ of normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M} (N_i^{ok}/\overline{U}_i)},$$

and when the bridge arm current is in a discharging direction, $$B_i = B_i^n = \frac{\overline{U}_i N_i^{ok}}{\sum_{i=1}^{M} (\overline{U}_i N_i^{ok})};$$

the selection switch unit is configured to select the weight $B_i$ of the administered valve based controller according to a determination result of the direction determination unit, and output the weight to the valve based controller input calculation unit; and the valve based controller input calculation unit is configured to calculate, according to the weight $B_i$ and the total number $N_{total}^{on}$, calculated by the bridge arm input calculation unit, of the submodules to be input in a corresponding bridge arm, the number $N_i^{on}$=round ($B_i$ $N_{total}^{on}$) of the submodules being input in each valve based controller, where round is a rounding function.

The present invention further provides a submodule distributed control system, which includes a converter valve, an upper-level controller, and a valve based controller, where all submodules of each bridge arm of the converter valve are grouped into M groups, M being ≥1, all the submodules include faulty submodules and normal submodules, the respective submodules in each group are equal or unequal in number, the normal submodules in each group are allowed to dynamically change in number, each group corresponds to one valve based controller, and each valve based controller separately operates; and the upper-level controller includes a submodule distributed control device as defined in claim 7 and is configured to calculate the number of input submodules and deliver the number to the valve based controller.

Advantageous Effect

By using the foregoing solutions, the present invention achieves the following beneficial effects:

(1) a load rate of the valve based controller is significantly reduced, and reliability of the valve based controller is improved;

(2) hardware expansion of the valve based controller is avoided, thereby decreasing the development period and the development costs;

(3) information about an average voltage of submodules in each group is introduced into the weight, whereby it can be ensured that the voltage is well balanced among groups; and (4) information about the number of normal submodules in each group is introduced into the weight, whereby it can be ensured that the calculated number of submodules being input in each group does not exceed the number of normal submodules in the group.

DETAILED DESCRIPTION OF THE INVENTION

The technical solutions of the present invention are described in detail below with reference to the accompanying drawings and specific embodiments.

In a submodule distributed control method, all submodules of each bridge arm of a converter valve are grouped into M groups, M being ≥1, all the submodules include faulty submodules and normal submodules, the respective submodules in each group may be equal or unequal in number, the normal submodules in each group are allowed to dynamically change in number, each group corresponds to one valve based controller, each valve based controller separately operates, an upper-level controller delivers the number of input submodules to the valve based controller, and the number of input submodules is calculated as follows:

(1) finding, by each valve based controller, an average voltage $\overline{U}_i$ of the normal submodules administered by the valve based controller, counting the number of $N_i^{ok}$ of the normal submodules, and sending the average voltage and the number to the upper-level controller;

(2) acquiring, by the upper-level controller, a bridge arm current $I_{arm}$ and determining a direction;

(3) solving, by the upper-level controller, a weight $B_i$ of each administered valve based controller according to the average voltage $\overline{U}_i$ of the normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M}(N_i^{ok}/\overline{U}_i)},$$

and when the bridge arm current is in a discharging direction, $$B_i = B_i^n = \frac{\overline{U}_i N_i^{ok}}{\sum_{i=1}^{M}(\overline{U}_i N_i^{ok})};$$

and (4) calculating, by the upper-level controller according to the total number $N_{total}^{on}$ of the submodules to be input in a corresponding bridge arm and the weight $B_i$ of each valve based controller, the number $N_i^{on}$=round $(B_i \, N_{total}^{on})$ of the submodules being input in each valve based controller, where round is a rounding function.

The upper-level controller can administer one or more bridge arms of the converter valve.

The normal submodules are submodules that can participate in normal switching.

The faulty submodules include submodules that are in a bypass state and a locked state, and a vacant slot on a converter valve tower.

A value of the subscript i of all variables ranges from 1 to M.

The charging direction refers to a direction of the bridge arm current when a submodule voltage rises, and the discharging direction refers to a direction of the bridge arm current when the submodule voltage drops.

Figure 1:
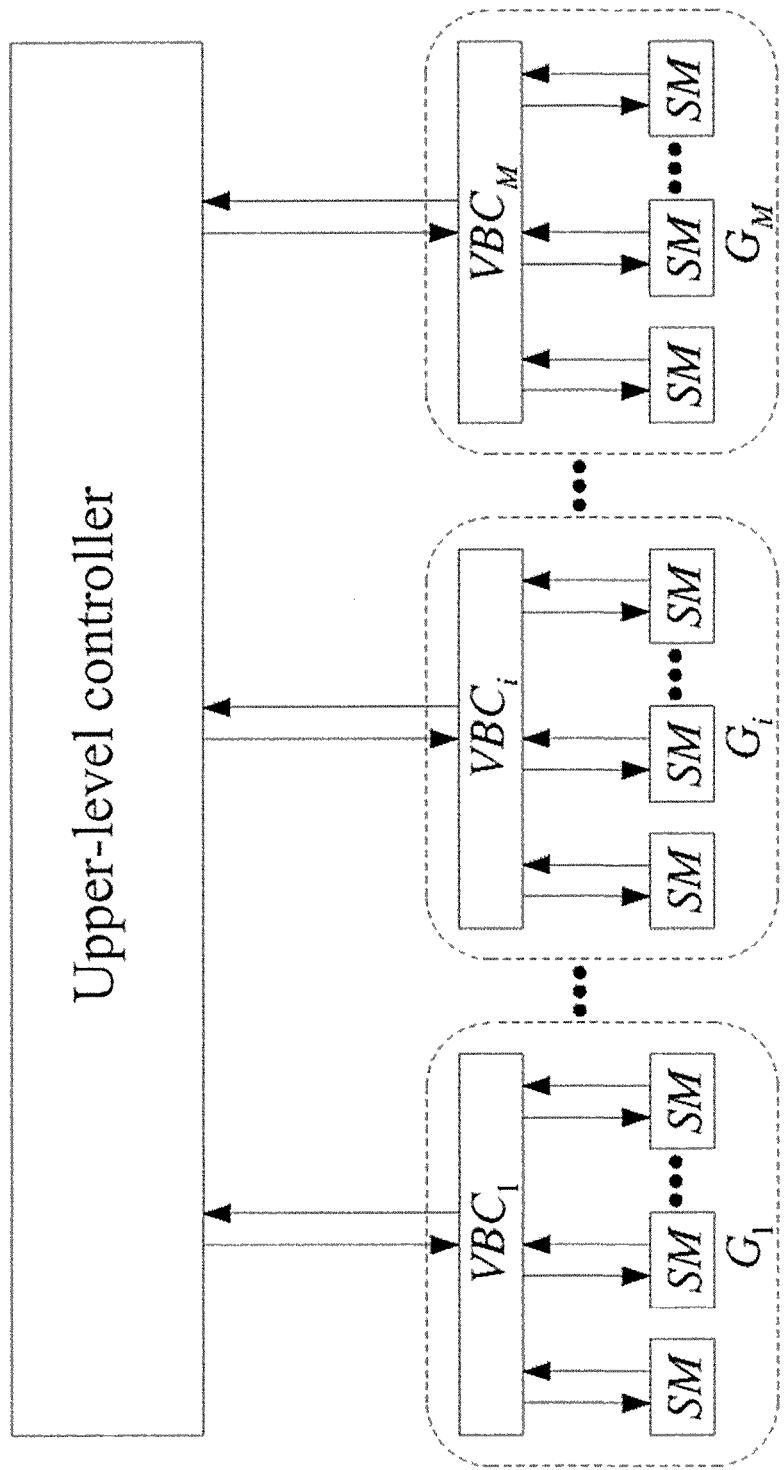
FIG. 1 is a diagram of a submodule distributed control structure, where VBC indicates a valve based controller and SM indicates a submodule.
Figure 2:
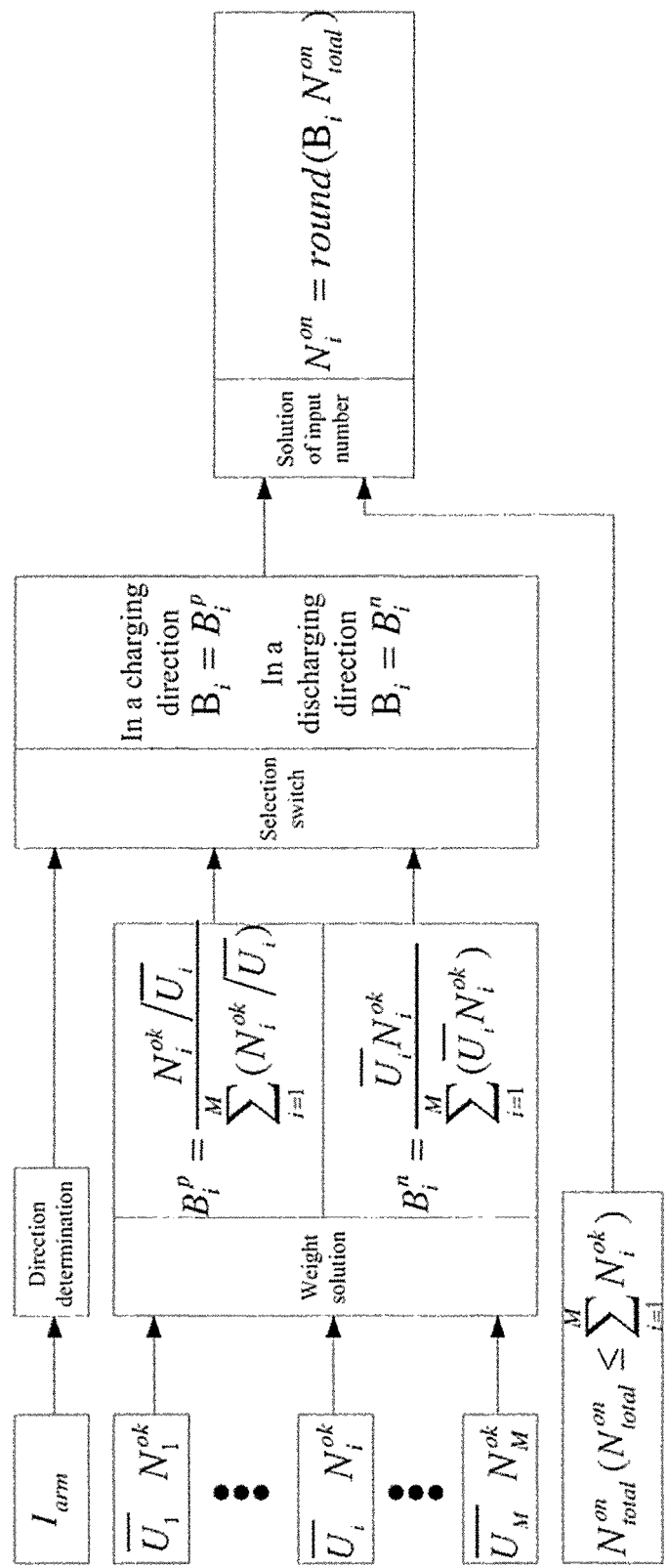
FIG. 2 is a schematic diagram of a submodule distributed control logic.
Figure 3:
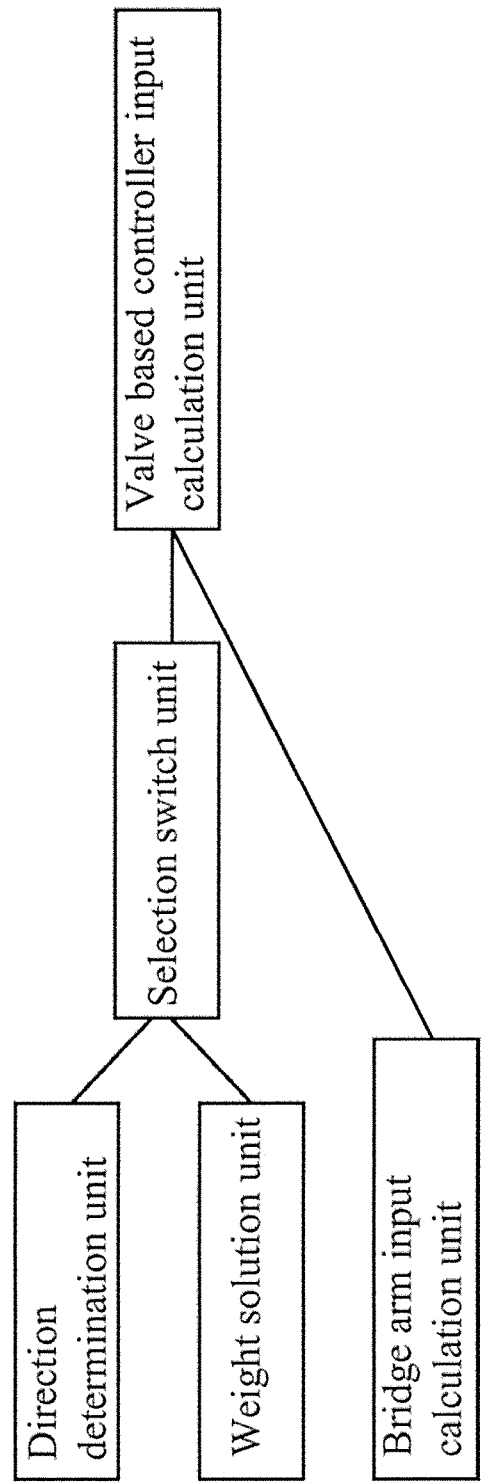
FIG. 3 is a schematic structural diagram of a submodule distributed control device of the present invention.

The present invention further provides a submodule distributed control device, which includes, as shown in FIG. 3, a direction determination unit, a weight solution unit, a selection switch unit, a bridge arm input calculation unit, and a valve based controller input calculation unit, where the direction determination unit is configured to determine a direction according to the acquired bridge arm current $I_{arm}$;

the weight solution unit is configured to solve a weight $B_i$ of each administered valve based controller according to an average voltage $\overline{U}_i$ of normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M}(N_i^{ok}/\overline{U}_i)},$$

and when the bridge arm current is in a discharging direction, $$B_i = B_i^n = \frac{\overline{U}_i N_i^{ok}}{\sum_{i=1}^{M}(\overline{U}_i N_i^{ok})};$$

the selection switch unit is configured to select the weight $B_i$ of the administered valve based controller according to a determination result of the direction determination unit, and output the weight to the valve based controller input calculation unit; and the valve based controller input calculation unit is configured to calculate, according to the weight $B_i$ and the total number $N_{total}^{on}$, calculated by the bridge arm input calculation unit, of the submodules to be input in a corresponding bridge arm, the number $N_i^{on}$=round $(B_i \, N_{total}^{on})$ of the submodules being input in each valve based controller, where round is a rounding function.

The present invention further provides a submodule distributed control system, which includes a converter valve, an upper-level controller, and a valve based controller, where all submodules of each bridge arm of the converter valve are grouped into M groups, M being ≥1, all the submodules include faulty submodules and normal submodules, the respective submodules in each group are equal or unequal in number, the normal submodules in each group are allowed to dynamically change in number, each group corresponds to one valve based controller, and each valve based controller separately operates; and the upper-level controller includes a submodule distributed control device of the present invention and is configured to calculate the number of input submodules and deliver the number to the valve based controller.

The foregoing embodiment merely describes the technical idea of the present invention, but is not intended to limit the protection scope of the present invention. Any modification made based on the technical solutions and according to the technical idea provided by the present invention falls within the protection scope of the present invention.

What is claimed is:

1. A submodule distributed control method, wherein all submodules of each bridge arm of a converter valve are grouped into M groups, M being ≥1, all the submodules comprise faulty submodules and normal submodules, the respective submodules in each group are equal or unequal in number, the normal submodules in each group are allowed to dynamically change in number, each group corresponds to one valve based controller, each valve based controller separately operates, an upper-level controller delivers the number of input submodules to the valve based controller, and the number of input submodules is calculated as follows:

(1) finding, by each valve based controller, an average voltage $\overline{U}_i$ of the normal submodules administered by the valve based controller, counting the number $N_i^{ok}$ of the normal submodules, and sending the average voltage and the number to the upper-level controller;

(2) acquiring, by the upper-level controller, a bridge arm current $I_{arm}$ and determining a direction;

(3) solving, by the upper-level controller, a weight $B_i$ of each administered valve based controller according to the average voltage $\overline{U}_i$ of the normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M}(N_i^{ok}/\overline{U}_i)},$$

and when the bridge arm current is in a discharging direction, $$B_i = B_i^n = \frac{\overline{U}_i N_i^{ok}}{\sum_{i=1}^{M}(\overline{U}_i N_i^{ok})};$$

and (4) calculating, by the upper-level controller according to the total number $N_{total}^{on}$ of the submodules to be input in a corresponding bridge arm and the weight $B_i$ of each valve based controller, the number $N_i^{on}$=round ($B_i$ $N_{total}^{on}$) of the submodules being input in each valve based controller, where round is a rounding function.

2. The submodule distributed control method according to claim 1, wherein the upper-level controller administers one or more bridge arms.

3. The submodule distributed control method according to claim 1, wherein the normal submodules are submodules that can participate in normal switching.

4. The submodule distributed control method according to claim 1, wherein the faulty submodules comprise submodules that are in a bypass state and a locked state, and a vacant slot on a converter valve tower.

5. The submodule distributed control method according to claim 1, wherein a value of the subscript i of all variables ranges from 1 to M.

6. The submodule distributed control method according to claim 1, wherein the charging direction in step (3) refers to a direction of the bridge arm current when a submodule voltage rises, and the discharging direction refers to a direction of the bridge arm current when the submodule voltage drops.

7. A submodule distributed control device, comprising a direction determination unit, a weight solution unit, a selection switch unit, a bridge arm input calculation unit, and a valve based controller input calculation unit, wherein the direction determination unit is configured to determine a direction according to the acquired bridge arm current $I_{arm}$;

the weight solution unit is configured to solve a weight $B_i$ of each administered valve based controller according to an average voltage $\overline{U}_i$ of normal submodules administered by each valve based controller, the number $N_i^{ok}$ of the normal submodules, and the direction of the bridge arm current, where when the bridge arm current is in a charging direction, $$B_i = B_i^p = \frac{N_i^{ok}/\overline{U}_i}{\sum_{i=1}^{M}(N_i^{ok}/\overline{U}_i)},$$

and when the bridge arm current is in a discharging direction, $$B_i = B_i^n = \frac{\overline{U}_i N_i^{ok}}{\sum_{i=1}^{M}(\overline{U}_i N_i^{ok})};$$

the selection switch unit is configured to select the weight $B_i$ of the administered valve based controller according to a determination result of the direction determination unit, and output the weight to the valve based controller input calculation unit; and the valve based controller input calculation unit is configured to calculate, according to the weight $B_i$ and the total number $N_{total}^{on}$, calculated by the bridge arm input calculation unit, of the submodules to be input in a corresponding bridge arm, the number $N_i^{on}$=round ($B_i$ $N_{total}^{on}$) of the submodules being input in each valve based controller, where round is a rounding function.

8. A submodule distributed control system, comprising a converter valve, an upper-level controller, and a valve based controller, wherein all submodules of each bridge arm of the converter valve are grouped into M groups, M being ≥1, all the submodules comprise faulty submodules and normal submodules, the respective submodules in each group are equal or unequal in number, the normal submodules in each group are allowed to dynamically change in number, each group corresponds to one valve based controller, and each valve based controller separately operates; and the upper-level controller comprises a submodule distributed control device as defined in claim 7 and is configured to calculate the number of input submodules and deliver the number to the valve based controller.

* * * * *